United States Patent Office 2,759,818
Patented Aug. 21, 1956

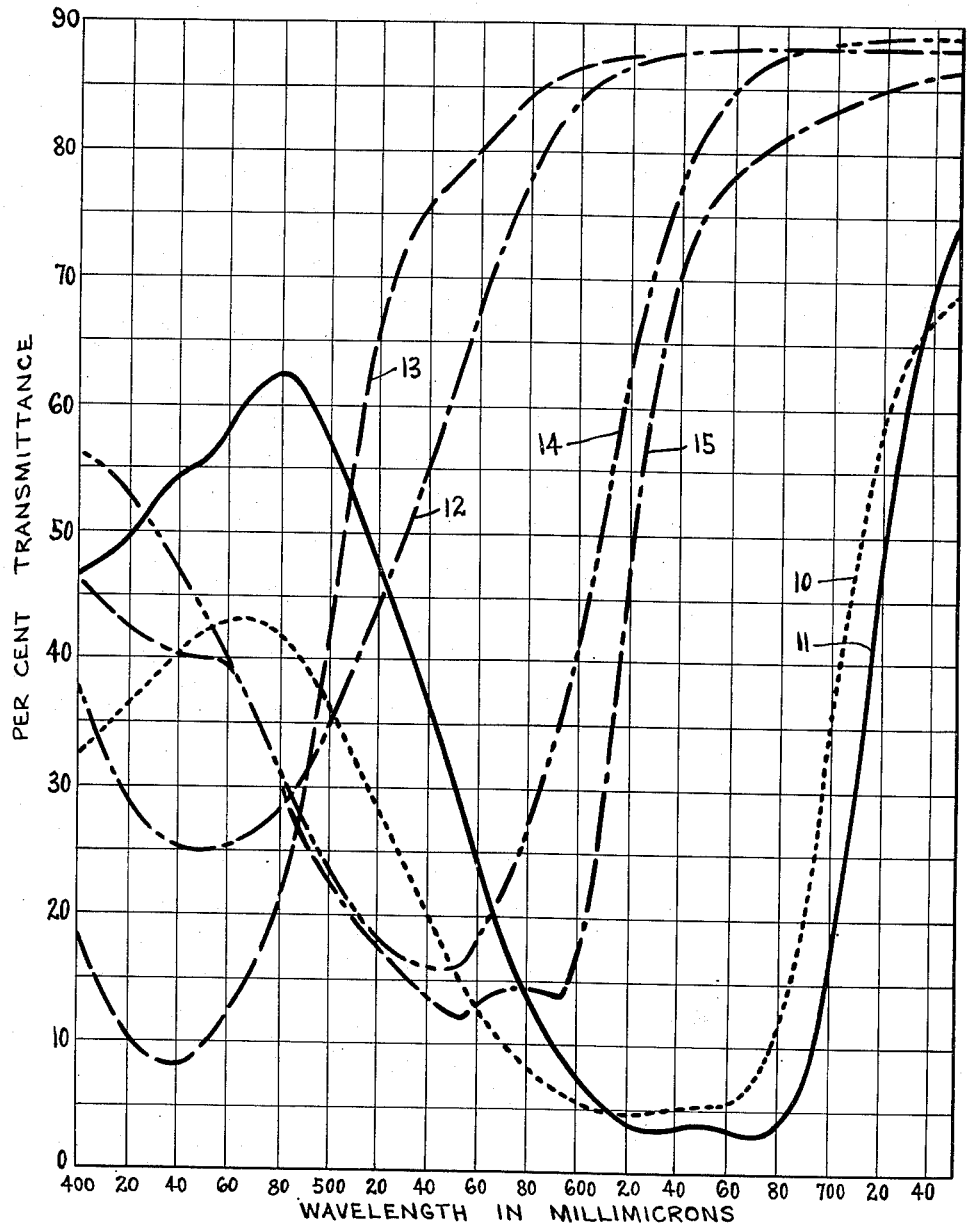

2,759,818
PHOTOGRAPHIC COLOR PROCESS

Joseph Mahler, Southport, Conn., assignor to American Optical Company, Southbridge, Mass., a voluntary association of Massachusetts Application November 30, 1951, Serial No. 259,099

5 Claims. (Cl. 95—2)

This invention relates to improvements in plastic films and has particular reference to colored films formed of polyvinyl alcohol and method of making the same.

One of the principal objects of this invention is to provide novel means and method of coloring polyvinyl alcohol film whereby the resultant color will be of controlled shade and density and of a stable nature.

Another object is to provide a novel picture film and method of making the same from polyvinyl alcohol whereby the image portion of the film may be produced either in black and white or in colors simulating those of a photographed object.

Another object is to provide novel means and method of forming a colored film embodying a matrix of polyvinyl alcohol treated with a sensitizer of a dye-forming type which upon exposure to ultra violet light will decompose whereby master color separation positives may be placed in superimposed relation with said sensitized matrix and exposed to ultra violet light to cause a dye-forming sensitized pattern to remain in said matrix, the said matrix then being caused to react with a coupler or couplers to produce a color or colors throughout said pattern dependent upon the particular coupler or couplers employed.

Other objects and advantages of the invention will become apparent from the following description taken in connection with the accompanying drawing in which The figure is a graph showing the transmission curves of colored films produced in accordance with this invention.

Polyvinyl alcohol is a white, tasteless, odorless, powder which is the product resulting from the hydrolyzation of either polyvinyl acetate or polyvinyl chloride, and films obtained from aqueous solutions or suspensions of polyvinyl alcohol are colorless, transparent and exceptionally tough, and exhibit excellent resistance to mineral and vegetable oils, simple alcohols, esters, ethyls and many other organic liquids. Polyvinyl alcohol has been found to be desirable for many uses such as in the manufacture of photographic films due to easy workability, low cost, and availability. However, in many cases such films are not practical due to the fact that polyvinyl alcohol is easily dissolved or softened by water, polyhydroxy alcohols and amino-alcohols.

Accordingly, the present invention deals with means and method of easily, efficiently and economically forming films of polyvinyl alcohol having a color or colors of controlled shade and density and of stable nature.

In accordance with this invention a film or sheet of polyvinyl alcohol is first immersed in a sensitizing solution formed in accordance with the following formula:

SOLUTION I

| Ingredient | Approximate Preferred Amount | Approximate Range |
|---|---|---|
| Water_____cc__ | 250 | _____ |
| Naphthanil diazo blue B salt (dianacitine)___ grams__ | 10 | 5 to 30 |
| Sodium Phosphate monobasic_____do____ | 30 | 10 to 70 |

In forming the sensitizing solution the mixture resulting from the above formula should be filtered to remove foam and large particles. Instead of sodium phosphate monobasic, a similar amount of ordinary sodium chloride can be used or a combination of equal parts of sodium chloride and sodium phosphate monobasic.

The film is preferably immersed in the sensitizing solution for approximately 2 minutes at a temperature of approximately 70° F. The time of immersion can range, however, from one to five minutes depending upon the temperature and upon the density desired of the color to be provided. For example, with higher temperature of about 80° F. the time cycle should be cut approximately in half.

After the film has been properly immersed in the sensitizing solution, the excess solution should be wiped off the surface of the film and the film then dipped for approximately 5 seconds in a solution formed as follows:

SOLUTION II

| Ingredient: | Preferred amount |
|---|---|
| Alcohol _____cc__ | 200 |
| Water _____cc__ | 50 |

By dipping the film in Solution II the salt which may have crystallized on the surface area of the film is removed. The film is then preferably again wiped and dried in air at room temperature for about one minute.

The foregoing sensitizing procedure introduces a dye-former within the material of the polyvinyl alcohol, which dye-former can be readily decomposed by exposure to ultra violet light.

In order to properly expose the sensitized film for producing an image thereon, three master color separation positives must be provided by conventional photographic methods, a separate master for each of the cyan, yellow and magenta colors.

The master color separation positive from which the cyan image is to be obtained is placed in a frame in superimposed relation with the sensitized film. The film is then exposed, through the positive, to ultra violet light for from ½ to 10 minutes, the time interval being controlled in accordance with the intensity of the ultra violet light used and density desired of the resultant color.

The ultra violet light will decompose the dye-former in the polyvinyl alcohol material in proportion to the differing opacities of the color separation positive, and, thus, a pattern of undecomposed and partially decomposed dye-former will remain after exposure.

The film is then placed in a cyan coupling solution which is formed substantially as follows:

A solution which we shall term Stock Solution A is first provided and is a highly concentrated salt solution formed in accordance with the following formula:

Stock solution A

| Ingredient: | Approximate preferred amount |
|---|---|
| Water _____cc__ | 1500 |
| Sodium chloride _____cc__ | 500 |

In Stock Solution A it has been found that a fully concentrated salt solution would work practically as well as the above formula. However, it is preferred that sodium chloride be used and that the amount of sodium chloride used to be held to approximately 35.7 grams per 100 cc. of water.

A second solution which we shall term Stock Solution B is also provided as follows:

*Stock solution B*

| Ingredient | Approximate Preferred Amount | Approximate Range |
|---|---|---|
| Stock Solution A_____cc__ | 400 | _____ |
| Sodium Hydroxide_____grams__ | 10 | 7 to 14 |

In forming Stock Solution B it has been found that potassium hydroxide may be substituted for the sodium hydroxide in equal amounts.

The actual cyan coupling solution then is formed as follows:

SOLUTION III

| Ingredient | Preferred Amount | Range |
|---|---|---|
| Stock Solution A_____cc__ | 200 | _____ |
| Stock Solution B_____cc__ | 50 | 30 to 70 |
| SS acid_____grams__ | 6 | 3 to 10 |

The SS acid referred to in the above Solution III can be defined as follows: 1 amino 8-naphthol 2, 4-disulfonic acid.

The polyvinyl alcohol film which has been previously sensitized and exposed in accordance with the procedure described above is immersed in the cyan coupling solution (Solution III) for from one to three minutes, preferably 2 minutes, and then rinsed for approximately 5 seconds in plain Stock Solution A to remove surface accumulation of the coupler.

The cyan coupling solution reacts with the undecomposed dye-former which remains in the polyvinyl alcohol material after the exposure of the film to ultra-violet light and thus forms a cyan color.

Then to adjust the resultant cyan color of the film to the exact blue-green color desired and to neutralize and stop further action of the coupler, the film is then immersed in a neutralizing solution formed substantially as follows:

SOLUTION IV

| Ingredient | Approximate Preferred Amount | Approximate Range |
|---|---|---|
| Stock Solution A_____cc__ | 250 | _____ |
| Cupric Chloride_____grams__ | 10 | 3 to 30 |

The film is immersed in the neutralizing solution (Solution IV) for a time interval of at least one minute, which time interval is the minimum to provide desired neutralizing and stopping action of the ingredients of Solution III. Following this the film is again rinsed in Stock Solution A for a sufficient length of time to remove the cupric chloride, and dried.

Referring to the drawing forming a part of these specifications, curve 10 illustates the transmission characteristics of a polyvinyl alcohol film immediately after treatment with the sensitizer and cyan coupling solution (Solution III). This curve shows peaks in the blue and in the high red areas with little transmission throughout the spectrum therebetween. Curve 11, however, indicates the shift in color obtained by subsequent treatment of the film with the copper neutralizing solution (Solution IV). The resultant higher peak in the blue region of the spectrum consequently indicates a deeper and denser blue color in the film.

The above described process completes the procedure necessary for exposing and developing the cyan color of the film.

To proceed to form a colored picture, the film having the cyan imprint thereon is then resensitized by immersion for approximately 1 minute in the sensitizing solution (Solution I) and is then wiped, rinsed for 5 seconds in Solution II, and rewiped and dried as in preparing for the cyan exposure. This again places the dye-former within the polyvinyl alcohol material.

At this point the yellow master color separation positive is superimposed upon the re-sensitized film and the assembly exposed to ultra violet light for a time interval sufficient to bring about the desired decomposition of the dye-former in the polyvinyl alcohol material as effected by the color separation positive.

The exposed film is then immersed in a yellow coupling solution formed as follows:

SOLUTION V

| Ingredient | Approximate Preferred Amount | Approximate Range |
|---|---|---|
| Stock Solution A_____cc__ | 200 | _____ |
| Stock Solution B_____cc__ | 50 | _____ |
| Phenol_____cc__ | 1½ | ½ to 2 |

The film is then immersed in Solution V for from 30 seconds to one minute, preferably for one minute. This permits the ingredients in Solution V to properly react with the dye-former in the material of the polyvinyl alcohol film. After the immersion in Solution V the film is rinsed in plain Stock Solution A and then immersed in Solution IV and rinsed and dried as described above with respect to forming the cyan color.

Curve 12 in the drawing indicates the transmission characteristics of a polyvinyl alcohol film treated with the yellow coupling solution (Solution IV). This curve shows high transmission in the red-orange-yellow and yellow-green regions of the spectrum with low transmission in the green and blue regions. Treatment of the film in the copper neutralizing solution (Solution IV), however, causes the color to be altered as indicated by curve 13 wherein a slight increase is noted in the green transmission and a considerable decrease in transmission results in the blue region of the spectrum. Thus, there results in the film a dense yellow color.

This completes the procedure for forming the yellow color in the film.

To provide a film with a magenta color the film must be again re-sensitized by immersion for approximately 1 minute in the sensitizing solution (Solution I), wiped, rinsed in Solution II, and again wiped and dried as in the procedure for sensitizing preceding the cyan and yellow exposures.

A picture film, which at this point, is provided with the yellow and cyan imprints and which now again contains the dye-former, is then superimposed with the magenta master color separation positive and exposed to ultra violet light in a manner similar to that described above.

Following the exposure, the film is immersed in a magenta coupling solution formed substantially as follows:

SOLUTION VI

| Ingredient | Approximate Preferred Amount | Approximate Range |
|---|---|---|
| m-aminophenol_____cc__ | .5 | .3 to .5 |
| in Alcohol_____cc__ | 15 | 5 to 20 |
| Stock Solution B_____cc__ | 25 | 15 to 50 |
| Stock Solution A_____cc__ | 225 | _____ |

In the foregoing formula the amount of Stock Solution A used should be an amount sufficient to total, with the amount of Stock Solution B, approximately 250 cc.

The sensitized and exposed film is immersed in Solution

VI for approximately 15 seconds, preferably, which permits the ingredients in Solution VI to react with the dye-former in the polyvinyl alcohol film to provide the film with a magenta color. Following this the film is rinsed, neutralized in Solution IV, rinsed again, and dried as in the foregoing procedures.

A polyvinyl alcohol film following immersion in the magenta coupling solution (Solution VI) will be provided with a color as indicated by transmission curve 14. Curve 14 indicates high transmission in the red and orange regions of the spectrum, low transmission in the yellow and green regions, and moderately high transmission in the blue region. However, subsequent treatment with the copper neutralizing solution (Solution IV) results in the altering of the magenta color to a color as indicated by curve 15. Curve 15 indicates a decrease in transmission in the red and orange regions of the spectrum and also a slight decrease in the blue region. Thus, the resultant color will be shifted from a rose color to a reddish-blue color.

The polyvinyl alcohol picture film at this stage, due to the accumulation of the three dyes, will be provided with the image or pattern in natural colors. However, since polyvinyl alcohol film is dissolved or softened by water, it is generally desirable to treat the film with a fixing solution comprising a 5% boric acid solution which will cause the polyvinyl alcohol to become a hard permanent film which will be water resistant. This fixing procedure, however, is only essential when it is desired that the resultant product be resistant to water.

A polyvinyl alcohol film may be formed with a substantial uniform color throughout by first immersing the film in Solution I, rinsing the film in Solution II and then immersing the film in the desired coupler according to the color to be formed, that is, cyan, yellow or magenta. This is, of course, accomplished by the fact that since the color is to be substantially uniform throughout the film, it is unnecessary to bring about decomposition of the sensitizer. Thus, the sensitized film can be immediately coupled and neutralized to provide the desired color. This is also true in instances where the film is to be provided with a color obtainable by combining any two or all three of the cyan, yellow and magenta colors. In the latter case, the procedure is followed as in forming picture films with the exception that the exposing steps are eliminated.

To provide the film with a color which is not easily obtainable by combining cyan, yellow and blue colors, it is desirable that master color separation positives be made by initial photographing the color desired. Thus, the entire procedure described in the foregoing description can be followed to provide the film with the exact desired color throughout.

When forming ordinary black and white pictures in accordance with this invention, one master color separation positive only is necessary. The film is first sensitized, then exposed under ultra violet light to the master. In this instance the exposed film is treated with a coupling solution embodying cyan and magenta, neutralized in Solution IV, and dried in the manner described in the foregoing description. Following this, the film is re-sensitized, exposed and processed as taught with respect to forming the yellow image, it being particularly pointed out, however, that the same master color separation positive is used for each of the exposures. When the successive exposing and developing processes have been completed the image on the film will be black rather than in colors due to the fact that a single master color separation positive was used.

From the foregoing it is apparent that all of the objects and advantages of the invention have been accomplished.

It is apparent, however, that many changes may be made in the means, method and formulae described without departing from the spirit of the invention, and it is therefore desired that all matter described be considered as illustrative and not in a limiting sense.

I claim:
1. The method of forming a colored picture film comprising sensitizing a film of polyvinyl alcohol with a solution comprising approximately 250 cc. of water, approximately 5 to 30 grams of naphthanil diazo blue B salts, and approximately 10 to 70 grams of sodium phosphate monobasic to form within said film a sensitizer of a dye-forming type, exposing said sensitized film to ultra-violet light through a cyan master color separation positive, for causing decomposition of said sensitizer in accordance with the varying opacity of said cyan master color separation positive, subjecting said exposed film to a cyan coupling solution comprising approximately 200 cc. of a first stock solution embodying approximately 500 cc. of sodium chloride and approximately 1500 cc. of water having added thereto approximately 30 to 70 cc. of a second stock solution embodying approximately 7 to 14 grams of potassium hydroxide and approximately 400 cc. of said first stock solution and further having added thereto approximately 3 to 10 grams of 1 amino 8-naphthol 2,4-disulfonic acid for a time interval sufficient to permit said cyan coupling solution to react with the undecomposed dye-forming sensitizer in said film to produce an image of a cyan color, treating said film with a neutralizing solution comprising approximately 250 cc. of said first stock solution having approximately 3 to 30 grams of cupric chloride added thereto for stopping action of said cyan coupling solution and to cause the cyan color to assume the desired shade and density, resensitizing said film with more of said water solution of diazo salts and sodium phosphate monobasic, exposing the resensitized film to ultra-violet light through a yellow master color separation positive for decomposing said sensitizer in accordance with the varying opacity of said yellow master color separation positive, subjecting said exposed film to a yellow coupling solution comprising approximately 200 cc. of said first stock solution, approximately 50 cc. of said second stock solution, and approximately ½ to 2 cc. of phenol for a time interval sufficient to permit said yellow coupling solution to react with the undecomposed sensitizer in said film to produce an image according to said yellow master color separation positive, neutralizing the film in more of said mentioned neutralizing solution for producing the desired yellow shade and density, resensitizing said film with more of said water solution of diazo salt and sodium phosphate monobasic, exposing the resensitized film to ultra-violet light through a magenta master color separation positive for decomposing said sensitizer in accordance with the varying opacity of said magenta master color separation positive, subjecting said exposed film to a magenta coupling solution comprising approximately 225 cc. of said first stock solution, approximately 15 to 50 cc. of said second stock solution and approximately 5 to 20 cc. of alcohol having dissolved therein approximately .3 to .5 cc. of m-aminophenol for a time interval sufficient to permit said magenta coupling solution to react with the undecomposed sensitizer in said film to produce an image of a magenta color according to said magenta master color separation positive, and neutralizing the film in more of said neutralizing solution for causing the magenta color to assume the desired shade and density.

2. The method of forming a colored picture film comprising sensitizing a film of polyvinyl alcohol with a solution comprising approximately 250 cc. of water, approximately 10 grams of naphthanil diazo blue B salts, and approximately 30 grams of sodium phosphate monobasic to form within said film a sensitizer of a dye-forming type, exposing said sensitized film to ultra-violet light through a cyan master color separation positive for causing decomposition of said sensitizer in accordance with the varying opacity of said cyan master color separation positive, subjecting said exposed film to a cyan coupling solution comprising approximately 200 cc. of a first stock solution embodying approximately 500 cc. of sodium chloride and approximately 1500 cc. of water having added thereto approximately 50 cc. of a second stock solution embodying approximately 10 grams of potassium hydroxide and approximately 400 cc. of said first stock solution and further having added thereto approximately 6 grams of 1 amino 8-naphthol 2,4-disulfonic acid for a time interval sufficient to permit said cyan coupling solution to react with the undecomposed dye-forming sensitizer in said film to produce an image of a cyan color, treating said film with a neutralizing solution comprising approximately 250 cc. of said first stock solution having approximately 10 grams of cupric chloride added thereto for stopping action of said cyan coupling solution and to cause the cyan color to assume the desired shade and density, resensitizing said film with more of said mentioned diazo salt solution, exposing the resensitized film to ultra-violet light through a yellow master color separation positive for decomposing said sensitizer in accordance with the verying opacity of said yellow master color separation positive, subjecting said exposed film to a yellow coupling solution comprising approximately 200 cc. of said first stock solution and approximately ½ cc. of phenol for a time interval sufficient to permit said yellow coupling solution to react with the undecomposed sensitizer in said film to produce an image according to said yellow master color separation positive, neutralizing the film in more of said neutralizing solution for producing the desired yellow shade and density, resensitizing said film with more of said diazo salt solution exposing the resensitized film to ultra-violet light through a magenta master color separation positive for decomposing said sensitizer in accordance with the varying opacity of said magenta master color separation positive, subjecting said exposed film to a magenta coupling solution comprising approximately 225 cc. of said first stock solution, approximately 25 cc. of said second stock solution and approximately 15 cc. of alcohol having dissolved therein approximately .5 cc. of m-aminophenol for a time interval sufficient to permit said magenta coupling solution to react with the undecomposed sensitizer in said film to produce an image of a magenta color according to said magenta master color separation positive, and neutralizing the film in more of said neutralizing solution for causing the magenta color to assume the desired shade and density.

3. The method of forming a colored picture film comprising sensitizing a film of polyvinyl alcohol with a solution comprising approximately 250 cc. of water, approximately 10 grams of naphthanil diazo blue B salts, and approximately 30 grams of sodium phosphate monobasic to form within said film a sensitizer of a dye-forming type, exposing said sensitized film to ultra-violet light through a cyan master color separation positive, for causing decomposition of said sensitizer in accordance with the varying opacity of said cyan master color separation positive, subjecting said exposed film to a cyan coupling solution comprising approximately 200 cc. of a first stock solution embodying approximately 500 cc. of sodium chloride and approximately 1500 cc. of water having added thereto approximately 50 cc. of a second stock solution embodying approximately 10 grams of potassium hydroxide and approximately 400 cc. of said first stock solution and further having added thereto approximately 6 grams of 1 amino 8-naphthol 2,4-disulfonic acid for a time interval sufficient to permit said cyan coupling solution to react with the undecomposed dye-forming sensitizer in said film to produce an image of a cyan color, treating said film with a neutralizing solution comprising approximately 250 cc. of said first stock solution having approximately 10 grams of cupric chloride added thereto for stopping action of said cyan coupling solution and to cause the cyan color to assume the desired shade and density, resensitizing said film with more of said diazo salts solution, exposing the resensitized film to ultraviolet light through a yellow master color separation positive for decomposing said sensitizer in accordance with the varying opacity of said yellow master color separation positive, subjecting said exposed film to a yellow coupling solution comprising approximately 200 cc. of said first stock solution, approximately 50 cc. of said second stock solution, and approximately ½ cc. of phenol for a time interval sufficient to permit said yellow coupling solution to react with the undecomposed sensitizer in said film to produce an image according to said yellow master color separation positive, neutralizing the film in more of said neutralizing solution for producting the desired yellow shade and density, resensitizing said film with more of said diazo salts solution, exposing the resensitized film to ultra-violet light through a magenta master color separation positive for decomposing said sensitizer in accordance with the varying opacity of said magenta master color separation positive, subjecting said exposed film to a magenta coupling solution comprising approximately 225 cc. of said first stock solution, approximately 25 cc. of said second stock solution and approximately 15 cc. of alcohol having dissolved therein approximately .5 cc. of m-aminophenol for a time interval sufficient to permit said magenta coupling solution to react with the undecomposed sensitizer in said film to produce an image of a magenta color according to said magenta master color separation positive, neutralizing the film in more of said neutralizing solution for causing the magenta color to assume the desired shade and density, and subsequently treating said film with a 5% boric acid solution to stabilize said film.

4. The method of forming a colored picture film comprising sensitizing a film of polyvinyl alcohol with a sensitizing solution whose related proportions of ingredients are substantially equivalent to approximately 250 cc. of water, approximately 5 to 30 grams of naphthanil diazo blue B salts, and approximately 10 to 70 grams of a salt selected from a group comprising sodium chloride and sodium phosphate monobasic and combinations thereof to form within said film a sensitizer of a dye-forming type, exposing said sensitized film to ultra-violet light through a cyan master color separation positive for causing decomposition of said sensitizer in accordance with the varying opacity of said cyan master color separation positive, subjecting said exposed film to a cyan coupling solution whose related proportions of ingredients with respect to said first-mentioned sensitizing solution are substantially equivalent to approximately 200 cc. of a first stock solution embodying approximately 500 cc. of sodium chloride and approximately 1500 cc. of water having added thereto approximately 30 to 70 cc. of a second stock solution embodying approximately 7 to 14 grams of a base material selected from a hydroxide group comprising potassium and sodium hydroxide and combinations thereof and approximately 400 cc. of said first stock solution and further having added thereto approximately 3 to 10 grams of 1 amino 8 naphthol 2,4-disulfonic acid for a time interval sufficient to permit said cyan coupling solution to react with the undecomposed dye-forming sensitizer in said film to produce an image of a cyan color, treating said film with a neutralizing solution whose related proportions of ingredients are substantially equivalent to approximately 250 cc. of said first stock solution having approximately 3 to 30 grams of cupric chloride added thereto for stopping action of said cyan coupling solution and to cause said cyan color to assume the desired shade and density, resensitizing said film with said first-mentioned sensitizing solution, exposing the resensitized film to ultraviolet light through a yellow master color separation positive for decomposing said sensitizer in accordance with the varying opacity of said yellow master color separation positive, subjecting said exposed film to a yellow coupling solution whose related proportions of ingredients, in accordance with the basic sensitizing solution, are substantially equivalent to approximately 200 cc. of first stock solution, approximately 50 cc. of said second stock solution and approximately ½ to 2 cc. phenol for a time interval sufficient to permit said yellow coupling solution to react with the undecomposed sensitizer in said film to produce an image according to said yellow master color separation positive, neutralizing the film in more of said neutralizing solution for producing the desired yellow shade and density, resensitizing said film with more of said first-mentioned sensitizing solution, exposing the resensitized film to ultra-violet light through a magenta master color separation positive for decomposing said sensitizer in accordance with the varying opacity of said magenta master color separation positive, subjecting said exposed film to a magenta coupling solution whose related proportions of ingredients in accordance with said first-mentioned sensitizing solution are substantially equivalent to approximately 225 cc. of said first stock solution, approximately 15 to 50 cc. of said second stock solution and approximately 5 to 20 cc. of alcohol having dissolved therein approximately .3 to .5 cc. of m-aminophenol for a time interval sufficient to permit said magenta coupling solution to react with the undecomposed sensitizer in said film to produce an image of magenta color according to said magenta master color separation positive and neutralizing the film in more of said neutralizing solution to cause the magenta color to assume the desired shade and density.

5. In the art of producing a colored picture which is the composite of plural areas of different colors in a single film of polyvinyl alcohol, the steps of first sensitizing said film with a dye-forming naphthanil diazo blue B salt solution, exposing said sensitized film to ultra-violet light through a cyan master color separation positive for causing decomposition of said sensitizer in accordance with the varying opacity of said cyan master color separation positive, subjecting said exposed film to a cyan coupling solution which will couple with the undecomposed dye-forming sensitizer for a time interval sufficient to permit said cyan coupling solution to react with said undecomposed dye-forming sensitizer in said film and thereby produce a desired cyan colored picture area, treating said film with a neutralizing cupric chloride solution to cause said cyan colored picture area to assume the desired shade and density and to stop the action of and to neutralize said coupler, thereby reconditioning the polyvinyl film for resensitization without discoloration, and successively repeating the above steps for at least two additional colors, one comprising resensitizing the film with said dye-forming naphthanil diazo blue B salt solution, exposing the resensitized film to ultra-violet light through a yellow master color separation positive supported in proper superimposed positional relation with said first area for decomposing said sensitizer in accordance with the varying opacity of said yellow master color separation positive, subjecting said exposed film to a yellow coupling solution which will couple with the undecomposed dye-forming sensitizer for a time interval sufficient to produce the desired yellow color by reaction with the undecomposed sensitizer, and again treating said film with said cupric chloride solution for producing the desired yellow shade and to stop the action of and to neutralize said coupler, and the other comprising again resensitizing the film and exposing said film to ultra-violet light through a magenta color separation positive supported in proper superimposed positional relation with said first-mentioned areas for decomposing said sensitizer in accordance with the varying opacity of said magenta master color separation positive, subjecting said exposed film to a magenta coupling solution which will couple with the undecomposed dye-forming sensitizer for a time interval sufficient to produce the desired magenta color by reaction with the undecomposed sensitizer, and thereafter treating said film with said cupric chloride solution to cause the magenta colored area to assume the desired shade and color and to stop the action of and to neutralize said coupler and thereby complete said composite colored picture in said single film whereby the component colored areas of said composite picture will lie in a single plane and in fixed properly oriented relation with each other.

References Cited in the file of this patent

UNITED STATES PATENTS

| | | |
|---|---|---|
| 1,444,469 | Kogel | Feb. 6, 1923 |
| 1,710,455 | Langguth et al. | Apr. 23, 1929 |
| 1,837,679 | Schmidt et al. | Dec. 22, 1931 |
| 2,289,714 | Land | July 14, 1942 |
| 2,541,178 | Slifkin | Feb. 13, 1951 |

FOREIGN PATENTS

| | | |
|---|---|---|
| 299,010 | Great Britain | Jan. 15, 1930 |
| 309,166 | Great Britain | June 10, 1930 |